United States Patent Office 3,169,956
Patented Feb. 16, 1965

3,169,956
SUCROSE ORGANO-PHOSPHORUS ESTER
AND METHOD OF PREPARING IT
Giovanni Faraone and Alessandro Giorgetti, Cairo Montenotte, Italy, assignors to S.p.A. Ferrania
No Drawing. Filed June 7, 1962, Ser. No. 200,648
4 Claims. (Cl. 260—234)

The present invention is concerned with a new organic chemical compound which is a sucrose organo-phosphorus ester and, more particularly, a sucrose organophosphorus ester of the formula

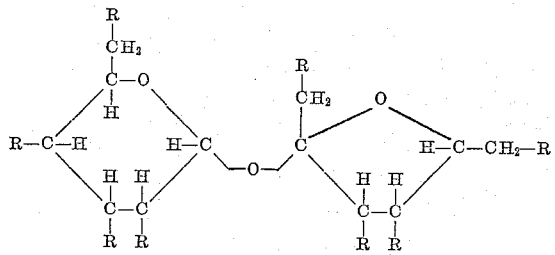

wherein R is a group

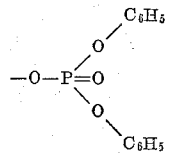

Furthermore, the invention is concerned with a process for producing sucrose octa-diphenyl-phosphate, which consists in reacting sucrose with mono-chloro-diphenyl-phosphate and anhydrous pyridine in the molar proportion 1:10:12 respectively, wherein mono-chloro-diphenyl-phosphate is added dropwise to the cooled mixture, and carrying out the reaction at a higher temperature until a complete esterification is reached.

The new compound, that we briefly indicate with the term "ZF," corresponds to the empirical formula $$C_{108}H_{94}O_{35}P_8$$

and is a high-viscous substance which is not soluble in water but soluble in alcohol as well as in other organic solvents.

M.W.: 2,198.
P, percent: 11.28.
Density: 20°/4° 1.35–1.36.

When to a solution of a cellulose ester, as for example cellulose acetate having an acetyl content of from 42.5% to 44.0% dissolved in a solvent mixture comprising methylene chloride, ethyl alcohol and a little quantity of a plasticizer, sucrose octa-diphenyl-phosphate is added in the proportion of 5–25 parts by weight of "ZF" per 100 parts by weight of the cellulose ester, it shows remarkable properties as a gelatinizing agent.

In order to describe our invention further, but without being limited thereto, the following example is given:

Example 360 gms. of sucrose, 2810 gms. of monochloro-diphenylphosphate and 990 gms. of anhydrous pyridine, corresponding to the molar proportion 1:10:12 respectively, were poured into a glass vessel provided with a condenser coil, a thermometer, a separating funnel, and stirring, and allowed to react.

The sucrose had been previously milled with the pyridine in a ball-mill, and to the resulting mixture, under vigorous stirring and cooling by means of water circulated at 4° C., monochloro-diphenylphosphate had been added, dropwise, from the separating funnel.

Thereupon the mixture was heated to 50° C. ± 2° C., and maintained at that temperature for 72 hours, until the esterification reaction was completed.

The resulting product, precipitated with water, was then repeatedly treated (four times) with 500 cc. of concentrated ammonia, 1000 cc. of water, 500 cc. of concentrated hydrochloric acid and further with 4000 cc. of water.

After most of the water had been separated, 3000 cc. of benzene were added, that is a sufficient quantity to dissolve the ester. An undissolved by-product of the reaction remained, the diphenyl-phosphoric acid amide, which was removed from the solution by filtration.

The solution was then evaporated under vacuum and the resulting viscous compound was finally heated, under vacuum, to 80–85° C. in order to completely separate the benzene.

2315 gms. of a product were obtained, which was sucrose-octa-diphenylphosphate.

Yield: 97%.

Analysis.—Calculated for $C_{108}H_{94}O_{35}P_8$: C, 58.96%; H, 4.276%; P, 11.28%. Found: C, 54.09%; H, 4.52%; P, 11.95%.

M.W.: 2,198.
Density: 20°/4° 1.35–1.36.

What we claim is:

1. Sucrose octa-diphenylphosphate.

2. A method of preparing sucrose octadiphenylphosphate comprising reacting monochlorodiphenylphosphate with a mixture of sucrose and anhydrous pyridine wherein the molar proportions are 10 parts of said monochlorodiphenylphosphate, 1 part of said sucrose and 12 parts of said anhydrous pyridine.

3. A method of preparing sucrose octadiphenylphosphate comprising adding monochlorodiphenylphosphate in small increments to an agitated mixture of sucrose and anhydrous pyridine cooled to approximately 4° C. wherein the molar proportions are 10 parts of said monochlorodiphenylphosphate, 1 part of said sucrose and 12 parts of said anhydrous pyridine, raising the temperature to approximately 50° C., continuing the reaction until esterification is complete, precipitating with water, and separating sucrose octadiphenylphosphate.

4. A method of preparing sucrose octadiphenylphosphate, comprising reacting sucrose and monochlorodiphenylphosphate with each other in the presence of anhydrous pyridine.

References Cited by the Examiner
UNITED STATES PATENTS 2,490,573   12/49   Ratcliffe et al. _____ 260—234
2,831,855   4/58    Martin _____ 260—234

CHARLES B. PARKER, Primary Examiner.